(12) United States Patent
Noh et al.

(10) Patent No.: US 10,651,989 B2
(45) Date of Patent: May 12, 2020

(54) METHOD AND APPARATUS FOR TRANSMITTING AND RECEIVING REFERENCE SIGNAL IN COMMUNICATION SYSTEM

(71) Applicant: Samsung Electronics Co., Ltd., Suwon-si, Gyeonggi-do (KR)

(72) Inventors: Jee-Hwan Noh, Suwon-si (KR); Tae-Young Kim, Seoul (KR); Hyun-Il Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/751,388

(22) PCT Filed: Aug. 12, 2016

(86) PCT No.: PCT/KR2016/008940
§ 371 (c)(1),
(2) Date: Feb. 8, 2018

(87) PCT Pub. No.: WO2017/026863
PCT Pub. Date: Feb. 16, 2017

(65) Prior Publication Data
US 2018/0241523 A1 Aug. 23, 2018

Related U.S. Application Data

(60) Provisional application No. 62/204,582, filed on Aug. 13, 2015.

(30) Foreign Application Priority Data

Aug. 11, 2016 (KR) .................. 10-2016-0102619

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0626* (2013.01); *H04W 24/10* (2013.01); *H04L 5/0007* (2013.01); *H04W 72/042* (2013.01)

(58) Field of Classification Search
CPC ... H04W 24/10; H04W 72/04; H04W 72/042; H04L 5/00; H04L 5/0007; H04B 7/0626
(Continued)

(56) References Cited

U.S. PATENT DOCUMENTS

2013/0223397 A1* 8/2013 Kim .................. H04L 5/0023
370/329
2013/0322276 A1* 12/2013 Pelletier .............. H04W 72/085
370/252

(Continued)

FOREIGN PATENT DOCUMENTS

CN 103780358 A 5/2014
KR 10-2016-0140024 A 12/2016
(Continued)

OTHER PUBLICATIONS

LG Electronics et al., WF on enhancements for aperiodic CSI-RS, 3GPP TSG RAN WG1 Meeting #84bis, R1-163582, Busan, Korea, Apr. 11, 2016.
(Continued)

*Primary Examiner* — Phong La
(74) *Attorney, Agent, or Firm* — Jefferson IP Law, LLP

(57) ABSTRACT

Disclosed is a 5G or pre-5G communication system for supporting a data transmission rate higher than that of a 4G communication system such as LTE. A method for receiving a reference signal, according to the present disclosure, comprises the steps of: receiving configuration information on a reference signal; determining whether the aperiodic transmission of the reference signal is instructed on the basis of the configuration information; receiving a signal for
(Continued)

(a)

(b)

(c)

requesting a measurement of the reference signal; measuring the reference signal on the basis of the configuration information when the received reference signal measurement request is aperiodic; generating channel state information on the basis of the measured result of the reference signal; and transmitting the channel state information.

16 Claims, 9 Drawing Sheets

(51) Int. Cl.
*H04W 24/10* (2009.01)
*H04W 72/04* (2009.01)

(58) Field of Classification Search
USPC .......................................................... 370/329
See application file for complete search history.

(56) References Cited

U.S. PATENT DOCUMENTS

| | | | |
|---|---|---|---|
| 2015/0049625 A1* | 2/2015 | Kim | H04L 1/0026 370/252 |
| 2015/0295694 A1 | 10/2015 | Li et al. | |
| 2016/0227548 A1* | 8/2016 | Nimbalker | H04W 72/042 |
| 2018/0175983 A1* | 6/2018 | Yum | H04L 5/0057 |
| 2018/0331742 A1* | 11/2018 | Yum | H04B 7/04 |

FOREIGN PATENT DOCUMENTS

| | | |
|---|---|---|
| WO | 2015/043427 A1 | 4/2015 |
| WO | 2015/048277 A1 | 4/2015 |

OTHER PUBLICATIONS

LG Electronics et al., WF on beamformed CSI-RS enhancements, 3GPP TSG RAN WG1 Meeting #85, R1-165585, Nanjing, China, May 23, 2016.

\* cited by examiner

```
CSI-RS-ConfigNZP-r11 ::=    SEQUENCE {
    csi-RS-ConfigNZPId-r11       CSI-RS-ConfigNZPId-r11,
    antennaPortsCount-r11        ENUMERATED {an1,an2,an4,an8},
    resourceConfig-r11           INTEGER (0..31),
    subframeConfig-r11           INTEGER (0..154),
    scramblingIdentity-r11       INTEGER (0..503),
```

FIG.5

METHOD AND APPARATUS FOR TRANSMITTING AND RECEIVING REFERENCE SIGNAL IN COMMUNICATION SYSTEM

CROSS-REFERENCE TO RELATED APPLICATION(S)

This application is a U.S. National Stage application under 35 U.S.C. § 371 of an International application filed on Aug. 12, 2016 and assigned application number PCT/KR2016/008940, which claimed the benefit of a U.S. Provisional patent application filed on Aug. 13, 2015 and assigned Ser. No. 62/204,582 and a Korean patent application filed on Aug. 11, 2016 and assigned Serial number 10-2016-0102619, the entire disclosure of which is hereby incorporated by reference.

TECHNICAL FIELD

The present disclosure relates to a method and an apparatus for transmitting or receiving a reference signal in a communication system.

BACKGROUND ART

In order to meet wireless data traffic demands, which have increased since the commercialization of the 4th Generation (4G) communication system, efforts to develop an improved 5G communication system or a pre-5G communication system have been made. For this reason, the 5G communication system or the pre-5G communication system is called a beyond 4G network communication system or a post LTE system.

In order to achieve a high data transmission rate, implementation of the 5G communication system in an ultrahigh frequency (mmWave) band (e.g., 60 GHz band) is being considered. In the 5G communication system, technologies such as beamforming, massive MIMO, Full Dimensional MIMO (FD-MIMO), an array antenna, analog beam-forming, and a large scale antenna technologies are being discussed as means to mitigate a propagation path loss in the ultrahigh frequency band and increase a propagation transmission distance.

Further, technologies such as evolved small cell, advanced small cell, cloud Radio Access Network (cloud RAN), ultra-dense network, Device to Device communication (D2D), wireless backhaul, moving network, cooperative communication, Coordinated Multi-Points (CoMP), and received interference cancellation have been developed to improve the system network in the 5G communication system.

In addition, the 5G system has resulted in the development of Advanced Coding Modulation (ACM) schemes such as Hybrid FSK and QAM Modulation (FQAM), and Sliding Window Superposition Coding (SWSC), and advanced access technologies such as Filter Bank Multi Carrier (FBMC), Non Orthogonal Multiple Access (NOMA), and Sparse Code Multiple Access (SCMA).

In a communication system, a user equipment (UE) reports channel state information between the UE and an eNodeB (eNB) to the eNB so as to communicate with the eNB. To make the UE report the channel state information, the eNB transmits a Channel State Information-Reference Signal (CSI-RS) to the UE. That is, the CSI-RS is a signal that the eNB transmits to the UE for purpose of making the UE feed the CSI back.

DETAILED DESCRIPTION OF THE INVENTION

Technical Problem

According to an aspect of the present disclosure, a beamformed CSI-RS (BF-CSI-RS) transmission method to support a plurality of user equipments (UEs) by an eNodeB (eNB) in an FD-MIMO system is provided. Here, a BF-CSI-RS indicates a CSI-RS transmitted to a predetermined UE.

Technical Solution

In accordance with an aspect of the present disclosure, a method of receiving a reference signal is provided, the method including: receiving configuration information on a reference signal; determining whether aperiodic transmission of the reference signal is indicated based on the configuration information; receiving a signal for requesting measurement of the reference signal; measuring the reference signal based on the configuration information when the received request for measuring the reference signal is an aperiodic request; generating channel state information based on a result of the measurement of the reference signal; and transmitting the channel state information.

In accordance with an aspect of the present disclosure, a method of transmitting a reference signal is provided, the method including: transmitting configuration information on a reference signal to be aperiodically transmitted; transmitting a signal for requesting measurement of the reference signal; and receiving channel state information on the reference signal.

In accordance with an aspect of the present disclosure, an apparatus for receiving a reference signal is provided, the apparatus including: a transceiving unit that receives configuration information on a reference signal, receives a signal for requesting measurement of the reference signal, and transmits channel state information; and a controller that determines whether aperiodic transmission of the reference signal is indicated based on the configuration information, measures the reference signal based on the configuration information when the received request for the measurement of the reference signal is an aperiodic request, and generates the channel state information based on a result of the measurement of the reference signal.

In accordance with an aspect of the present disclosure, an apparatus for transmitting a reference signal is provided, the apparatus including: a transceiving unit that transmits configuration information on a reference signal to be aperiodically transmitted; transmits a signal for requesting measurement of the reference signal; and receives channel state information on the reference signal; and a controller controls the transceiving unit.

BRIEF DESCRIPTION OF DRAWINGS

FIG. 5 is a diagram illustrating a radio resource control (RRC) message through which UE group CSI-RS subframe configuration information is transmitted to a UE;

MODE FOR CARRYING OUT THE INVENTION

Hereinafter, an embodiment of the present disclosure will be described in detail with reference to the accompanying drawings. In the following description of the present disclosure, a detailed description of known functions or configurations incorporated herein will be omitted when it may make the subject matter of the present disclosure rather unclear. The terms as described below are defined in consideration of the functions in the embodiments, and the meaning of the terms may vary according to the intention of a user or operator, convention, or the like. Therefore, the definitions of the terms should be made based on the contents throughout the specification.

Hereinafter, an eNode B (eNB) is a subject of transmitting a reference signal to a user equipment (UE), and may be at least one of an eNode B, a Node B, a base station (BS), a radio access unit, a BS controller, and a node on a network. The UE may include a UE, a mobile station (MS), a cellular phone, a smart phone, a computer, and a multimedia system capable of performing a communication function.

Embodiments of the present disclosure will be described based on a CSI-RS, and the descriptions may be applied to other reference signals. For example, the descriptions may be applied to a channel state information-interference measurement (CSI-IM).

The eNB may transmit a CSI-RS to the UE using, for example, 1, 2, 4, or 8 antenna ports. In this instance, their antenna port numbers (p) are respectively mapped to p=15, p=15~16, p=15~18, and p=15~22.

Figure 1:
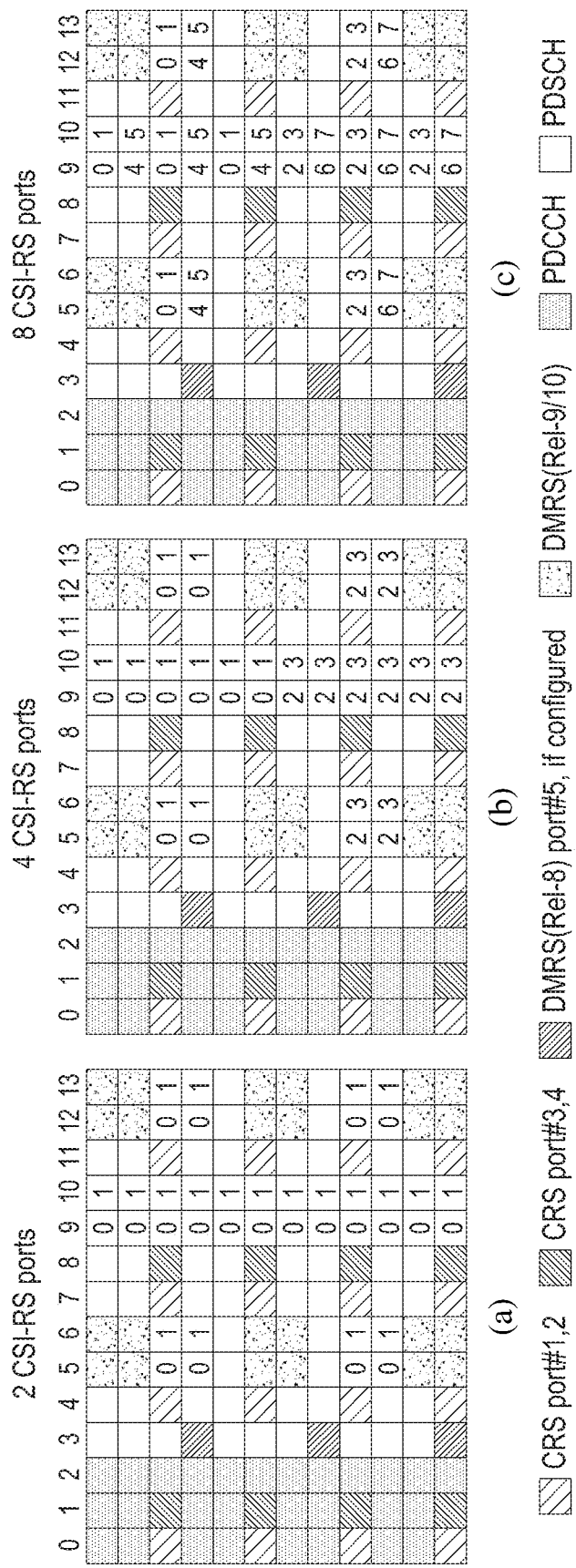
FIG. 1 is a diagram illustrating a resource pattern of a CSI-RS based on the number of antenna ports.

FIG. 1 is a diagram illustrating a CSI-RS pattern expressed on resources based on the number of antenna ports.

Referring to FIG. 1, a CSI-RS is mapped to a resource location corresponding to CSI-RS ports on a resource region including 14 orthogonal frequency division (OFDM) symbols in the horizontal axis and 12 subcarriers in the vertical axis.

When the number (CSI reference signal configuration) of CSI-RS configuration (or configuration) is transferred to the UE through a higher layer signal, the UE determines the resource location to which the CSI-RS is mapped, based on the number of CSI-RS antenna ports through Table 1. The resource location of the CSI-RS allocated to the UE based on the CSI-RS configuration may be the same for each resource block pair (RBP) and for each subframe.

TABLE 1

CSI-RS mapping based on the number of antenna ports

| CSI reference signal config- uration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |

In Table 1, k' and l' denote a subframe index and a subcarrier index, respectively. ns denotes a subframe.

Figure 2:
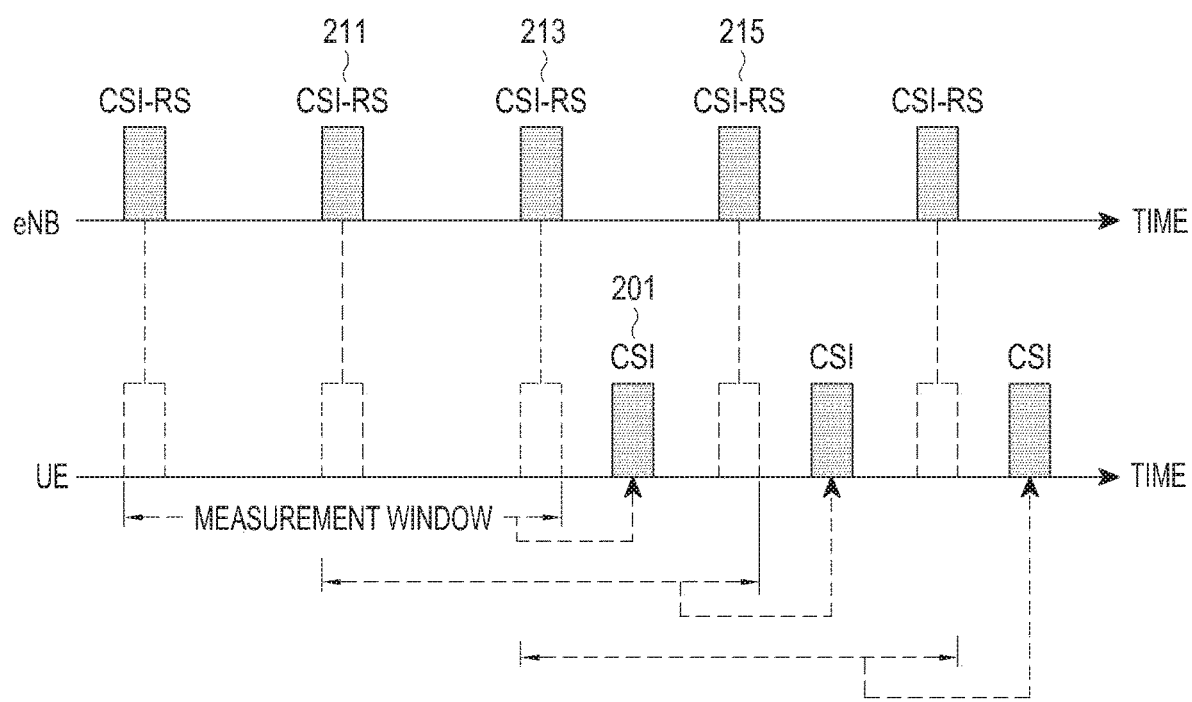
FIG. 2 is a diagram illustrating an example in which a user equipment (UE) performs CSI reporting using a plurality of CSI-RSs received from an eNode B (eNB)

Table 2 is used for defining the location of a subframe where a CSI-RS exists. Table 2 indicates a period (TCSI-RS) by which a CSI-RS is repeatedly transmitted on subframes, and an offset (ΔCSI-RS). In the same manner as the CSI-RS configuration of Table 1, a UE may estimate a subframe where a CSI-RS is located using CSI-RS subframe configuration information. For example, when an eNB transmits ICSI-RS=7 to the UE as CSI-RS subframe configuration information, the UE may estimate that a period by which a CSI-RS is repeatedly transmitted is 10 subframes and an offset is 7−5=2, that is, 2 subframes. Referring to FIG. 2, it is recognized that the minimum period by which a CSI-RS is repeatedly transmitted is 5 subframes, and the maximum period by which a CSI-RS is repeatedly transmitted is 80 subframes.

TABLE 2

CSI-RS subframe configuration

| CSI-RS-SubframeConfig $I_{CSI-RS}$ | CSI-RS-periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

According to 3GPP LTE Rel-12 standard, UEs belonging to a cell may use the same CSI-RS resource. That is, a cell-specific CSI-RS is transmitted. The UE measures a CSI-RS transmitted by the eNB without a separate indication. The UE reports, to the eNB, channel state information (CSI) generated based on a CSI-RS measurement value. This is referred to as CSI reporting. The CSI reporting is classified into periodic reporting and aperiodic reporting.

Also, the CSI may include at least one of a channel quality indicator (CQI), a precoding matrix indicator (PMI), and a rank indication (RI).

In order to increase the accuracy of CSI reporting, the UE may configure CSI using measurement values of recently received several CSI-RSs, as opposed to using a measurement value of one CSI-RS.

FIG. 2 is a diagram illustrating an example in which a UE performs CSI reporting using a plurality of CSI-RSs received from an eNB.

Referring to FIG. 2, three CSI-RS measurement values 211, 213, and 215 are used for reporting one CSI 201, and a CSI-RS measurement unit for CSI reporting is referred to as a measurement window 221. A measurement window of a UE may be differently set based on an implementation character for each UE or based on an environment of each UE.

In a full dimension multi-input multi-output (FD-MIMO) system, an eNB (i.e., a transmitting device) applies UE-specific beamforming to transmit a CSI-RS to a predetermined UE (i.e., a receiving device). The CSI-RS transmission method is referred to as beamformed CSI-RS (BF-CSI-RS) method, and a CSI-RS that an eNB transmits to a predetermined UE is referred to as a BF-CSI-RS. The eNB sets appropriate beamforming and transmits the BF-CSI-RS to the predetermined UE, whereby CSI-RS measurement performance may be improved. A subframe in which the BF-CSI-RS is to be transmitted needs to be pre-configured, and the BF-CSI-RS may be periodically transmitted in units of subframes. The BF-CSI-RS is specific for a UE, whereby the eNB needs to designate resources for different BF-CSI-RSs for respective UEs in a cell. However, when the number of UEs to which BF-CSI-RSs need to be transmitted increases in a cell, overhead associated with the resources may increase. Therefore, there is a desire for a method of transmitting a BF-CSI-RS to support a plurality of UEs.

In the present disclosure, a BF-CSI-RS transmission method to support a plurality of UEs by an eNB in an FD-MIMO system is provided. A BF-CSI-RS and a CSI-RS are not completely different from each other. Hereinafter, the BF-CSI-RS and the CSI-RS may be interchangeably used.

For transmission of a UE-specific BF-CSI-RS, an eNB allocates, to each UE, a CSI-RS resource, that is, a resource for transmitting a BF-CSI-RS. Here, the CSI-RS resource may include a CSI-RS configuration and a CSI-RS subframe configuration. When a BF-CSI-RS is transmitted to a UE, the UE may measure the CSI-RS to configure CSI. In order to increase the accuracy of the measurement of the CSI-RS, the UE sets a measurement window, and configures and reports CSI using the CSI-RSs received in the set measurement window.

Hereinafter, BF-CSI-RS transmission for supporting a plurality of UEs, and a method for CSI-RS measurement and CSI reporting operations performed by a UE will be provided.

An embodiment of the present disclosure provides a method in which an eNB allocates an orthogonal CSI-RS resource to each UE for BF-CSI-RS transmission. The orthogonal CSI-RS resources indicate different CSI-RS subframes or different CSI-RS configurations allocated to respective UEs. The fact that the eNB differently sets at least one of the CSI-RS configuration and the CSI-RS subframe configuration for respective UEs may indicate that orthogonal CSI-RS resources are used. Accordingly, at least one of CSI-RS configuration and CSI-RS subframe configuration of each UE which is assigned with an orthogonal CSI-RS resource may be different from those of other UEs.

In the embodiment, the eNB transfers information on a CSI-RS configuration and a CSI-RS subframe configuration allocated to each UE through a higher layer signal. The each UE estimates and measures a CSI-RS allocated to the corresponding UE using the received signal. The each UE configures CSI based on a CSI-RS measurement result and reports the same to the eNB. In this instance, the eNB allocates an orthogonal CSI-RS resource to each UE, whereby a UE-specific BF-CSI-RS transmission is simply enabled.

Figure 3:
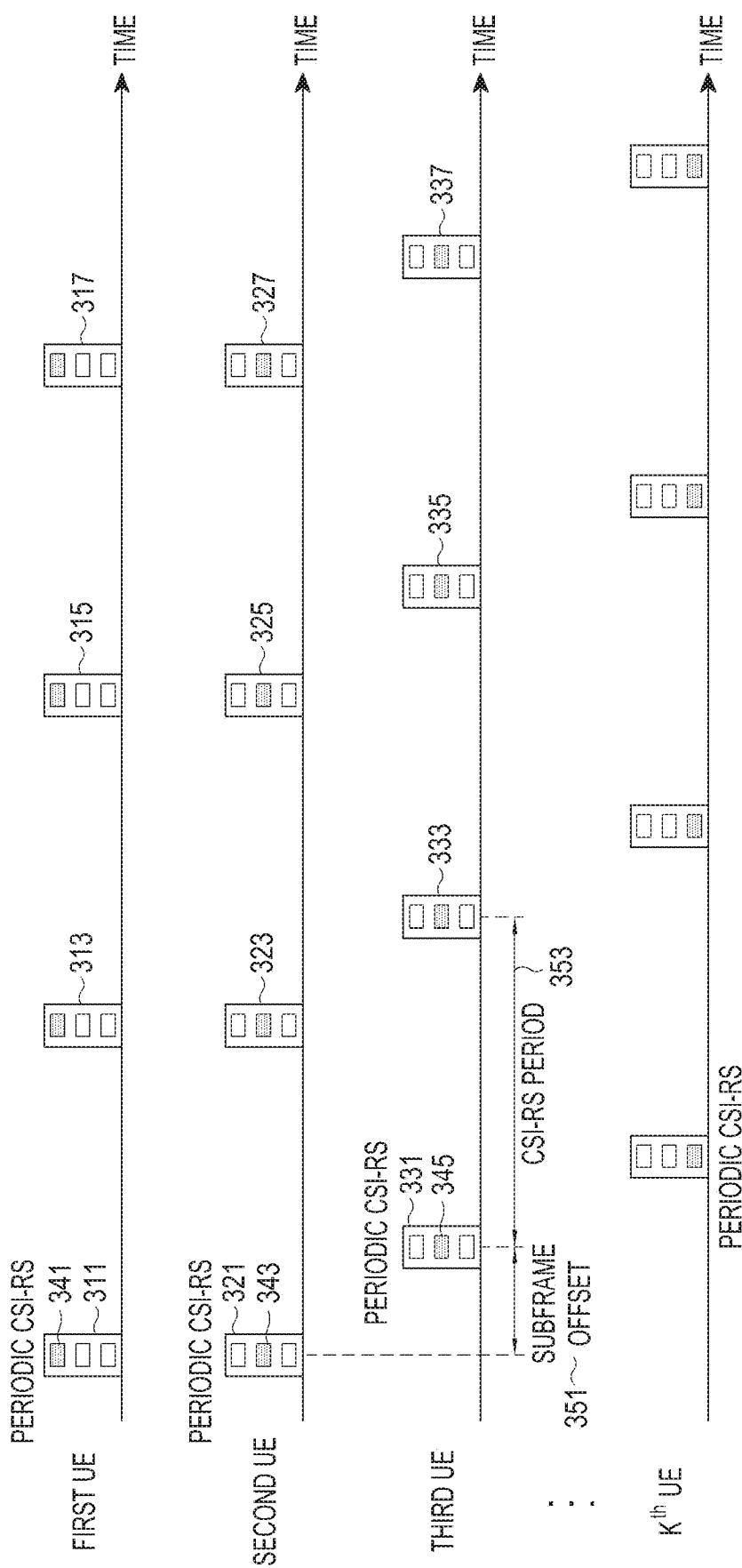
FIG. 3 is a diagram illustrating an example in which an eNB allocates an orthogonal CSI-RS resource to each UE in a cell, and transmits a BF-CSI-RS according to the present disclosure.

FIG. 3 is a diagram illustrating an operation in which an eNB allocates an orthogonal CSI-RS resource to each UE in a cell, and transmits a BF-CSI-RS according to an embodiment the present disclosure.

Referring to FIG. 3, the eNB allocates CSI-RS configurations or CSI-RS subframe configurations to K UEs. For example, a CSI-RS subframe configuration indicating CSI-RS subframes 311, 313, 315, and 317 allocated to a first UE 301 by the eNB is the same as a CSI-RS subframe configuration indicating CSI-RS subframes 321, 323, 325, and 327, allocated to a second UE 303. However, a CSI-RS configuration 341 allocated to the first UE 301 by the eNB and a CSI-RS configuration 343 allocated to the second UE 303 are different from each other.

As another example, the CSI-RS configuration 343 allocated to the second UE 303 by the eNB and a CSI-RS configuration 345 allocated to a third UE 305 are the same. However, the CSI-RS subframe configuration indicating the CSI-RS subframes 321, 323, 325, and 327 allocated to the second UE 303 by the eNB and a CSI-RS subframe configuration indicating CSI-RS subframes 331, 333, 335, and 337 allocated to the third UE 305 are different from each other. In other words, although a period 353 (hereinafter, referred to as a CSI-RS period) of CSI-RS transmission indicated by the CSI-RS subframe configuration of the third UE 305 is the same as a CSI-RS period of the CSI-RS subframe configuration of the second UE 303, when an offset 351 of the CSI-RS subframe configuration of the third UE 305 and an offset of the CSI-RS subframe configuration of the second UE 303 are different from each other, it is determined that the second UE 303 and the third UE 305 have different CSI-RS subframe configurations.

When orthogonal CSI-RS resources are allocated to UEs in a cell as illustrated in FIG. 3, a problem occurs in that overhead associated with CSI-RS resources increases as the number of UEs increases in the cell. As a method of alleviating the overhead problem, a method of setting a CSI-RS period of each UE to be long may be considered. However, when the CSI-RS period of each UE is long, a frequency of reporting CSI to the eNB by each UE decreases. When the frequency of reporting CSI decreases, mismatch may occur between a channel state during data transmission/reception and a channel state during channel measurement. Although the method includes the drawback, the method may be applied to when the number of UEs is small. Accordingly, it is not intended to exclude the embodiment from the present disclosure.

To overcome the drawback occurring when the CSI-RS period of each UE is set to be long, another embodiment of the present disclosure provides a method of allocating a CSI-RS resource for each UE group, additionally or in parallel. It is assumed that UEs belonging to a predetermined UE group use the same CSI-RS configuration. Also, UEs belonging to the predetermined UE group share a CSI-RS subframe configuration, that is, a UE group-specific CSI-RS subframe configuration. The eNB allocates CSI-RS subframes included in the UE-group CSI-RS subframe configuration to each UE.

Figure 4:
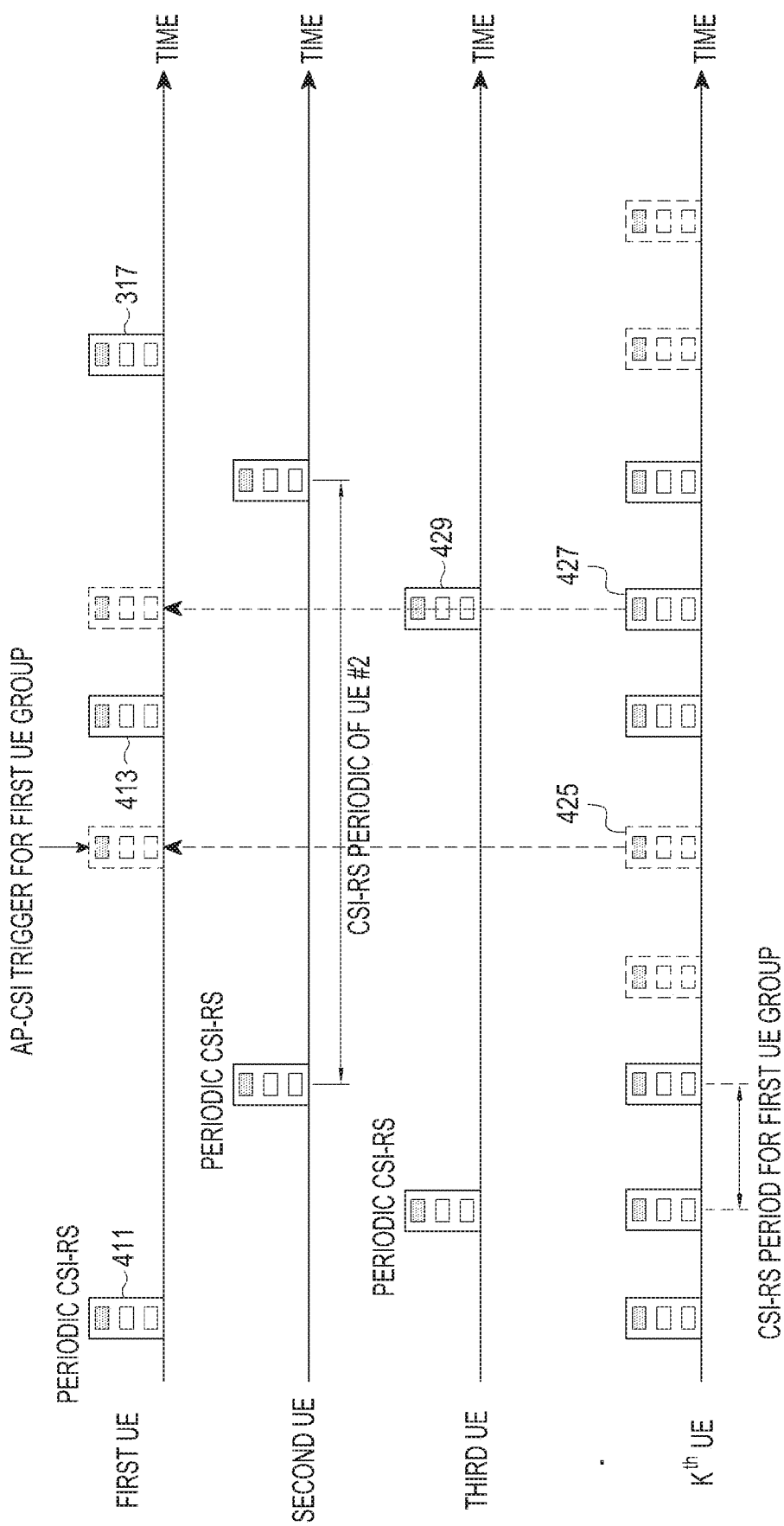
FIG. 4 is a diagram illustrating an example in which an eNB transmits a CSI-RS configuration additionally allocated for each UE group in a cell according to the present disclosure.

FIG. 4 is a diagram illustrating an example in which an eNB transmits a CSI-RS configuration additionally allocated for each UE group in a cell according to the present disclosure.

Referring to FIG. 4, a first UE group in a cell may include a first UE 401, a second UE 403, ..., and a Kth UE 405. An eNB may allocate different CSI-RS configurations and CSI-RS subframe configurations to the first UE 401, the second UE 403, and the Kth UE 405, respectively. In this instance, a CSI-RS period may be set to be long in order to overcome the overhead problem. The eNB may additionally allocate a CSI-RS configuration for the first UE group. Although FIG. 4 illustrates that the CSI-RS configurations of the UEs 401, 403, and 405 included in the first UE group and the CSI-RS configuration of the first UE group are the same, the configurations may be set to be different from each other. Also, although FIG. 4 illustrates that the CSI-RS subframe configurations of all UEs included in the first UE group is included in the CSI-RS subframe configuration of the first UE group, it is not always required.

In the embodiment, to overcome the problem occurring when a CSI-RS period is long, the eNB transmits a CSI-RS, when required, to a UE where the problem occurs, and receives CSI reporting. Referring to FIG. 4, the CSI-RS that the eNB transmits when required is one of the CSI-RSs included in UE group-specific CSI-RS subframe configuration for a group where the UE including the problem belongs. For example, the first UE 401 periodically receives a CSI-RS 411 and 413 based on the set CSI-RS configuration and the CSI-RS subframe configuration. When it is determined that a channel state based on the CSI reported by the first UE 401 is different from an actual channel state, the eNB additionally transmits an unscheduled CSI-RS 425 and 427 which is included in the CSI-RS subframe configuration of the first UE group where the first UE 401 belongs to, in addition to a CSI-RS UE-specifically allocated to the first UE 401. In this instance, the eNB transmits a signal indicating that a CSI-RS is to be transmitted to the first UE 401 so as to receive CSI from the first UE 401. The signal may be an aperiodic CSI trigger (AP-CSI trigger) signal.

A first CSI-RS 425, which is additionally transmitted together with an AP-CSI trigger signal to the first UE 401 by the eNB, is not transmitted to any other UEs belonging to the first UE group. However, a second CSI-RS 427, which is additionally transmitted together with an AP-CSI trigger signal to the first UE 401 by the eNB, may be a signal allocated to the Kth UE 405 by the eNB. In this instance, a CSI-RS collision may occur. In other words, the first UE 401 receives an AP-CSI trigger signal, recognizes that the CSI-RS 427 which is not scheduled to the first UE 401 itself is to be newly allocated, and measures the newly allocated CSI-RS 427. However, the Kth UE 405 may recognize the CSI-RS 427, which is newly allocated to the first UE 401, as a CSI-RS 429 allocated to the Kth UE 405 itself. In this situation, when an additional indication thereof is not provided to the Kth UE 405, the Kth UE 405 may determine that the CSI-RS 427 transmitted to the first UE 401 as a signal for the Kth UE 405 itself, and a problem may occur in that the Kth UE 405 includes the same in a measurement window. Although the method includes the drawback, it is not intended to exclude the embodiment from the present disclosure.

According to the embodiment, as a UE group CSI-RS period is short, a degree of freedom for an AP-CSI report of an eNB increases. A CSI-RS is transmitted only when a CSI-RS is actually allocated to UEs belonging to a UE group, instead of that all CSI-RSs in a UE group CSI-RS subframe configuration are transmitted. Accordingly, even when the UE group CSI-RS period is short, overhead does not actually increase. Therefore, it is preferable that the CSI-RS period of a UE group-specific CSI-RS subframe configuration is short. For example, referring to Table 2, a CSI-RS subframe configuration may be set to 0. In this instance, the UE group CSI-RS subframe configuration may be set such that a CSI-RS is transmitted in all subframes.

FIG. 5 is a diagram illustrating a radio resource control (RRC) message through which UE group CSI-RS subframe configuration information is transmitted to a UE.

Referring to FIG. 5, the RRC message includes CSI-RS-ConfigNZP information including UE group CSI-RS subframe configuration information. The CSI-RS-ConfigNZP information includes csi-RS-ConfigNZId indicating a CSI-RS configuration number, antennaPortsCount indicating the number of antenna ports, resourceConfig indicating a CSI-RS resource configuration, subframeConfig indicating a CSI-RS subframe configuration, scramblingIdentity indicating a scrambling identity, and the like.

Hereinafter, embodiments of the present disclosure will be described in detail.

According to an embodiment of the present disclosure, an eNB operates one CSI process and two CSI-RS subframe configurations for each UE. The CSI process indicates a series of processes from when the eNB transmits a CSI-RS to the UE to receive CSI reporting to when the eNB receives the CSI reporting from the UE. Generally, the eNB operates one CSI-RS subframe configuration for one CSI process for one UE.

To enable the eNB to operate two CSI-RS subframe configurations for one CSI process for one UE, a new CSI process may be defined, which enables two CSI-RS subframe configurations. Alternatively, an existing CSI process may be changed to use two CSI-RS subframe configurations. One of the two CSI-RS subframe configurations may be utilized for purpose of a UE group CSI-RS subframe configuration.

Particularly, it is assumed that the UE periodically reports CSI in association with a UE-specific CSI-RS subframe, and aperiodically reports CSI in association with a UE group based CSI-RS subframe configuration. The UE fundamentally performs CSI-RS measurement according to the UE-specific CSI-RS subframe configuration and, when an AP-CSI trigger signal is transmitted, the UE adds a CSI-RS according to the UE-group CSI-RS subframe configuration to a measurement window, the CSI-RS existing in an AP-CSI interval (an interval from when an AP-CSI trigger signal is transmitted to when a CSI is reported). That is, measurement based on the UE group CSI-RS subframe configuration is not fundamentally performed. As described above, only when an AP-CSI trigger signal is transmitted, measurement of a CSI-RS according to the CSI-RS subframe configuration, which exists in a corresponding interval is reflected.

For example, when the eNB desires to transmit an unscheduled CSI-RS, that is, an aperiodic CSI-RS to the UE, the eNB may need to set an AP-CSI triggering timing such that a corresponding CSI-RS subframe is included in AP-CSI reporting. The AP-CSI trigger signal includes the meaning of indicating measurement of a UE group CSI-RS subframe and thus, the AP-CSI triggering timing needs to come at the same time of, or earlier than, the unscheduled CSI-RS subframe.

Hereinafter, several measurement restriction methods associated with CSI-RS measurement in each UE will be described.

A first method is to restrict a measurement window of a UE to one subframe unit. When the measurement window is 1, an eNB may not need to provide an additional indication to a UE (e.g., the Kth UE in FIG. 4) to which a UE-specific CSI-RS is allocated even though a CSI-RS collision occurs. According to the method of restricting the measurement window to one subframe, CSI-RS measurement accuracy may decrease. However, it is the simplest method for overcoming a problem related to a measurement window which may occur when a BF-CSI-RS is transmitted.

A second method is to inform a UE of a point in time when to reset measurement using a DCI format. According to the second method, under the situation of a CSI-RS collision, an eNB may indicate resetting of measurement in a CSI-RS subframe coming after the CSI-RS collision, to a UE to which a UE-specific CSI-RS is allocated. That is, new measurement begins in a CSI-RS subframe subsequent to the CSI-RS collision. According to the second method, a restriction on a measurement window is not given to the UE, excluding measurement resetting, and thus, the second method has a higher degree of freedom than the first method from the perspective of implementation by the UE.

A third method is not to give a measurement restriction to a UE. The third method provides a UE with the maximum degree of freedom associated with CSI-RS measurement. According to the third method, when a CSI-RS collision occurs, an eNB may disregard CSI reporting from the UE during several subframes, that is, a predetermined period of time. In other words, the eNB may not reflect the CSI reporting to scheduling.

According to another embodiment of the present disclosure, an eNB may operate two CSI processes for each UE. A first CSI process is a CSI process for a UE-specific CSI-RS configuration and a second CSI process is a CSI process for a UE group CSI-RS configuration. In this instance, the first CSI process supports both periodic/aperiodic CSI reporting, and a UE needs to measure and report a CSI-RS according to a UE-specific CSI-RS subframe configuration as described above. However, the second process requires only aperiodic CSI reporting for an unscheduled CSI-RS and thus, periodic CSI reporting may not need to be performed. Therefore, a method for the second process, that is, a method of aperiodically reporting a CSI, is required.

Table 3 shows a CSI reporting period by which a UE periodically reports a CSI to an eNB according to a higher layer signal.

In Table 3, ICQI/PMI denotes an index of a CSI reporting period. Npd denotes a CSI reporting period. NOFFSET,CQI denotes an offset of subframes in which a CSI is reported. For example, when ICQI/PMI=30 is transmitted through a higher layer signal, the UE sets 20 subframes as a CSI reporting period, sets ICQI/PMI−17=30−17=13 subframes as an offset, and reports CSI.

However, in an interval of ICQI/PMI=317 or 542≤ICQI/PMI≤1023 in Table 3, a CSI reporting period (Npd) is not defined. A configuration indicating an infinite period (indicating no CSI reporting) may be defined using a predetermined ICQI/PMI value of an interval or an ICQI/PMI interval where the CSI reporting period is not defined. Therefore, when the eNB sets ICQI/PMI including an infinite CSI reporting period for the UE, the UE may not perform periodic CSI reporting associated with a UE group CSI process.

TABLE 3

| $I_{CQI/PMI}$ | Value of $N_{pd}$ | Value of $N_{OFFSET, CQI}$ |
|---|---|---|
| $0 \le I_{CQI/PMI} \le 1$ | 2 | $I_{CQI/PMI}$ |
| $2 \le I_{CQI/PMI} \le 6$ | 5 | $I_{CQI/PMI} - 2$ |
| $7 \le I_{CQI/PMI} \le 16$ | 10 | $I_{CQI/PMI} - 7$ |
| $17 \le I_{CQI/PMI} \le 36$ | 20 | $I_{CQI/PMI} - 17$ |
| $37 \le I_{CQI/PMI} \le 76$ | 40 | $I_{CQI/PMI} - 37$ |
| $77 \le I_{CQI/PMI} \le 156$ | 80 | $I_{CQI/PMI} - 77$ |
| $157 \le I_{CQI/PMI} \le 316$ | 160 | $I_{CQI/PMI} - 157$ |
| $I_{CQI/PMI} = 317$ | | Reserved |
| $318 \le I_{CQI/PMI} \le 349$ | 32 | $I_{CQI/PMI} - 318$ |
| $350 \le I_{CQI/PMI} \le 413$ | 64 | $I_{CQI/PMI} - 350$ |
| $414 \le I_{CQI/PMI} \le 541$ | 128 | $I_{CQI/PMI} - 414$ |
| $542 \le I_{CQI/PMI} \le 1023$ | | Reserved |

It is assumed that the second process performs CSI-RS measurement for AP-CSI reporting. Here, each UE knows of UE group CSI-RS subframe configuration using a UE group CSI process, but may not know whether a predetermined subframe included in the UE group CSI-RS subframe configuration is allocated to another UE. Therefore, in the second process, a measurement window is set based on one subframe unit. When the eNB desires to transmit an unscheduled CSI-RS to a UE, the eNB indicates an AP-CSI trigger signal to the second process. Also, when the second process currently measures a CSI-RS, an AP-CSI trigger signal may be indicated after an unscheduled CSI-RS subframe. As described above, the unit of the second measurement window is one subframe. Also, the above described CSI-RS measurement restriction methods in each UE may be applied.

Another embodiment of the present disclosure provides a method of distinguishing a periodic CSI-RS resource and an aperiodic CSI-RS resource. The difference with the above described embodiments is that a UE-specific periodic CSI-RS resource and a CSI-RS resource shared by a plurality of UEs use different CSI-RS configurations. The CSI-RS resource shared by the plurality of UEs is referred to as a "shared CSI-RS candidate pool", and is utilized as an aperiodic CSI-RS resource. From the perspective of a predetermined UE, the CSI-RSs in the shared CSI-RS candidate pool may not be periodically allocated and thus, they may be regarded as aperiodic CSI-RS s.

Figure 6:
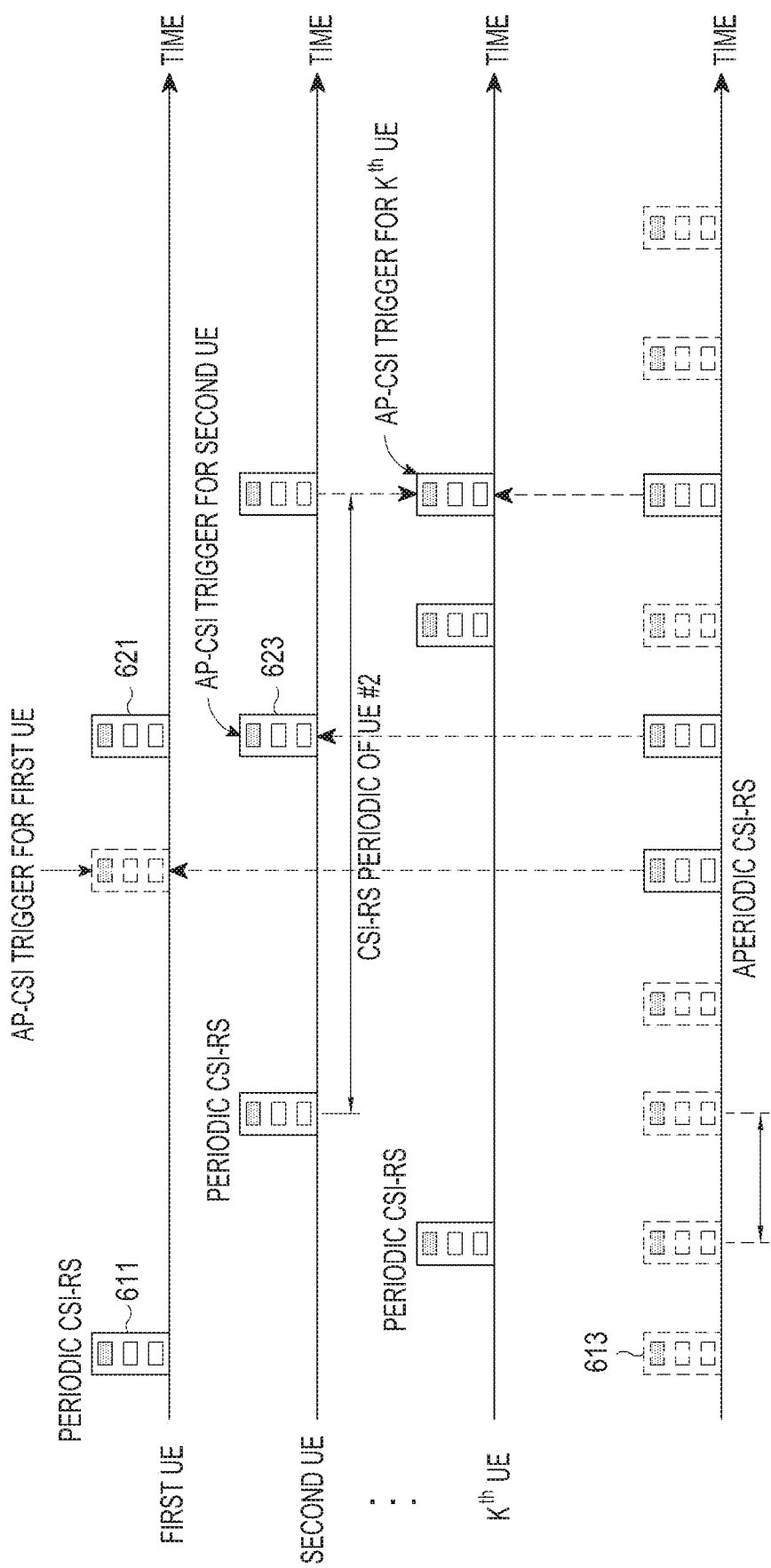
FIG. 6 is a diagram illustrating a method of allocating a CSI-RS resource based on a shared CSI-RS candidate pool according to the present disclosure.

FIG. 6 is a diagram illustrating a method of allocating a CSI-RS resource based on a shared CSI-RS candidate pool according to the present disclosure.

Referring to FIG. 6, it is recognized that a CSI-RS configuration 611 of a periodic CSI-RS resource of each UE and a shared CSI-RS candidate pool, that is, a CSI-RS configuration 613 of an aperiodic CSI-RS resource, are different from each other. Each UE receives periodic CSI-RS configuration information and CSI-RS configuration information associated with a shared CSI-RS candidate pool from an eNB through an RRC message. The eNB transmits an AP-CSI trigger signal (or a CSI request signal) to a predetermined UE, thereby allocating a corresponding subframe in the shared CSI-RS candidate pool to the predetermined UE. In this embodiment, a periodic CSI-RS configuration 621 of a UE and a CSI-RS configuration 623 of a shared CSI-RS candidate pool of another UE are different from each other, unlike FIG. 4, and thus, a CSI-RS collision does not occur even when the CSI-RSs are allocated in the same subframe.

According to an embodiment, the eNB may utilize a CSI request field of downlink control information (DCI) so as to allocate an aperiodic CSI-RS. Although the CSI request signal is for triggering CSI reporting, the eNB provides a DCI indication, which additionally includes a function of allocating an aperiodic CSI-RS, whereby CSI-RS allocation and requesting CSI reporting are simultaneously performed.

To this end, the eNB adds an aperiodic CSI-RS configuration to CSI-RS-ConfigNZP of an RRC message. Hereinafter, several methods for adding an aperiodic CSI-RS configuration are provided.

A first method is to set both a CSI-RS subframe configuration (a subframe period and an offset) and a CSI-RS configuration (i.e., CSI-RS location in subframes) for an aperiodic CSI-RS resource. Here, it is assumed that a periodic CSI-RS resource may or may not exist. The CSI-RS allocation method using a DCI indication may include the following two options.

A first option is to allocate an aperiodic CSI-RS to a CSI-RS subframe candidate indicated by DCI or a first CSI-RS subframe candidate thereafter, from among CSI-RS subframe candidates based on a CSI-RS subframe configuration.

A second option is to allocate an aperiodic CSI-RS to a CSI-RS subframe candidate that is the closest to a subframe indicated by DCI from among CSI-RS subframe candidates based on the CSI-RS subframe configuration.

According to the first option, an aperiodic CSI-RS is allocated to a subframe identical to the subframe indicated by DCI or a subsequent subframe. According to the second option, an aperiodic CSI-RS may be allocated to a subframe even before the subframe indicated by the DCI.

A second method is to set only a CSI-RS configuration for an aperiodic CSI-RS resource. An eNB does not set a CSI-RS subframe configuration and thus, may allocate an aperiodic CSI-RS to any subframe. An aperiodic CSI-RS is allocated to a subframe indicated by DCI.

The first method and the second method correspond to a method of distinguishing a periodic CSI-RS resource and an aperiodic CSI-RS resource.

A third method is to set one or more CSI-RS resources for a UE, and activate or deactivate each CSI-RS resource. In the same manner as the first method, the third method needs to set a CSI-RS subframe configuration (a subframe period and an offset) and a CSI-RS configuration (i.e., CSI-RS location in subframes) for a CSI-RS resource configuration. Also, the CSI-RS resource is activated or deactivated using a DCI indication, which is referred to as a CSI-RS activation field. A method of activating or deactivating a CSI-RS resource using a CSI-RS activation field may include the following two options.

According to a first option, an eNB allocates a CSI-RS according to a CSI-RS resource configuration after firstly transmitting a corresponding DCI (activation) for CSI-RS activation to a UE. Also, after the eNB secondly transmits an indication of DCI (deactivation), the eNB does not allocate a CSI-RS. The number of bits of the 'CSI-RS activation field' is determined based on the number of CSI-RS resources. For example, when the number of CSI-RS resources is N, the number of bits is ($\log_2$ N).

According to a second option, to indicate activation or deactivation of a CSI-RS resource, '1' or '0' is indicated through a CSI-RS activation field. When the UE receives an indication of '1', the UE determines that a CSI-RS resource is activated. When receiving an indication of '0', the UE determines that a CSI-RS is deactivated. In the second option, the number of bits of the 'CSI-RS activation field' id determined based on the number of CSI-RS resources. When the number of CSI-RS resources is N, the number of bits is N.

A fourth method is to set and reports whether a CSI-RS resource is a periodic resource or aperiodic resource when transmitting a CSI-RS resource configuration through an RRC message. When the set CSI-RS resource is a periodic resource, the UE operates in the same manner as an existing method. When the set CSI-RS resource is an aperiodic resource, the UE operates according to one of the above described embodiments. Also, the number of CSI-RS resources set by the eNB in one CSI process may be one or more.

Hereinafter, a method of setting parameters required for a CSI-RS resource configuration will be described.

The parameters required for the CSI-RS resource configuration may be semi-statically set. The method is referred to as a semi-static parameter configuration method. According to the method, the parameters may be set through an RRC message. An eNB may set parameters, such as the number of CSI-RS ports, a CSI-RS configuration, a CSI-RS subframe configuration, and the like, for a UE through an RRC message.

According to another method, one or more parameters required for the CSI-RS resource configuration may be dynamically set through DCI. Parameters which can be set through the DCI may be the number of CSI-RS ports, a CSI-RS configuration, and the like. For example, an eNB may change the number of CSI-RS ports using DCI. When the eNB supports 2, 4, 8, or 12 CSI-RS ports, the number of CSI-RS ports may be indicated using 2 bits of the DCI. Also, the eNB may change a CSI-RS configuration. That is, N CSI-RS configurations for each CSI-RS resource may be set through an RRC message, and one of the N CSI-RS configurations may be selected through DCI.

Hereinafter, a method of overcoming overhead and rate matching through introduction of an aperiodic CSI-RS will be described. An aperiodic CSI-RS is not periodically allocated, and thus, there is a desire for a method of using a subframe to which a CSI-RS is not actually allocated as a physical downlink shared channel (PDSCH). Also, when an aperiodic CSI-RS is allocated to a predetermined UE, there is a desire for a method of preventing other UEs from interpreting the aperiodic CSI-RS resource as a PDSCH.

According to an embodiment of the present disclosure, a UE fundamentally recognizes an aperiodic CSI-RS resource as a PDSCH. When a first UE is assigned with an aperiodic CSI-RS in a Kth subframe using DCI, the first UE assumes that a CSI-RS exists in the Kth subframe. However, other UEs do not know whether a CSI-RS exists in the Kth subframe and thus, the UEs may recognize the CSI-RS transmitted in the Kth subframe as a PDSCH. To prevent the above, when an aperiodic CSI-RS is allocated to a predetermined UE, a new DCI field is needed to inform other UEs excluding the predetermined UE of the corresponding information. In the present disclosure, the DCI field is referred to as 'Dynamic ZP CSI-RS'. When a UE receives an indication of 'Dynamic ZP CSI-RS' through DCI, the predetermined UE may interpret that an aperiodic CSI-RS is allocated to another UE.

According to an embodiment of the present disclosure, a UE fundamentally recognizes a set aperiodic CSI-RS resource as a CSI-RS. When an aperiodic CSI-RS resource is not allocated to any UE, a subframe reserved for the allocation of the aperiodic CSI-RS may be wasted. To prevent the above, when an aperiodic CSI-RS is not allocated to any UE, a DCI field is needed to enable UEs assigned with a corresponding subframe as a PDSCH to recognize an aperiodic CSI-RS resource as data through DCI. In the present disclosure, the DCI field is referred to as 'Data mapping'. When a predetermined UE receives an indication of 'Data mapping' through DCI, the UE may interpret an aperiodic CSI-RS resource as data for itself.

Figure 7:
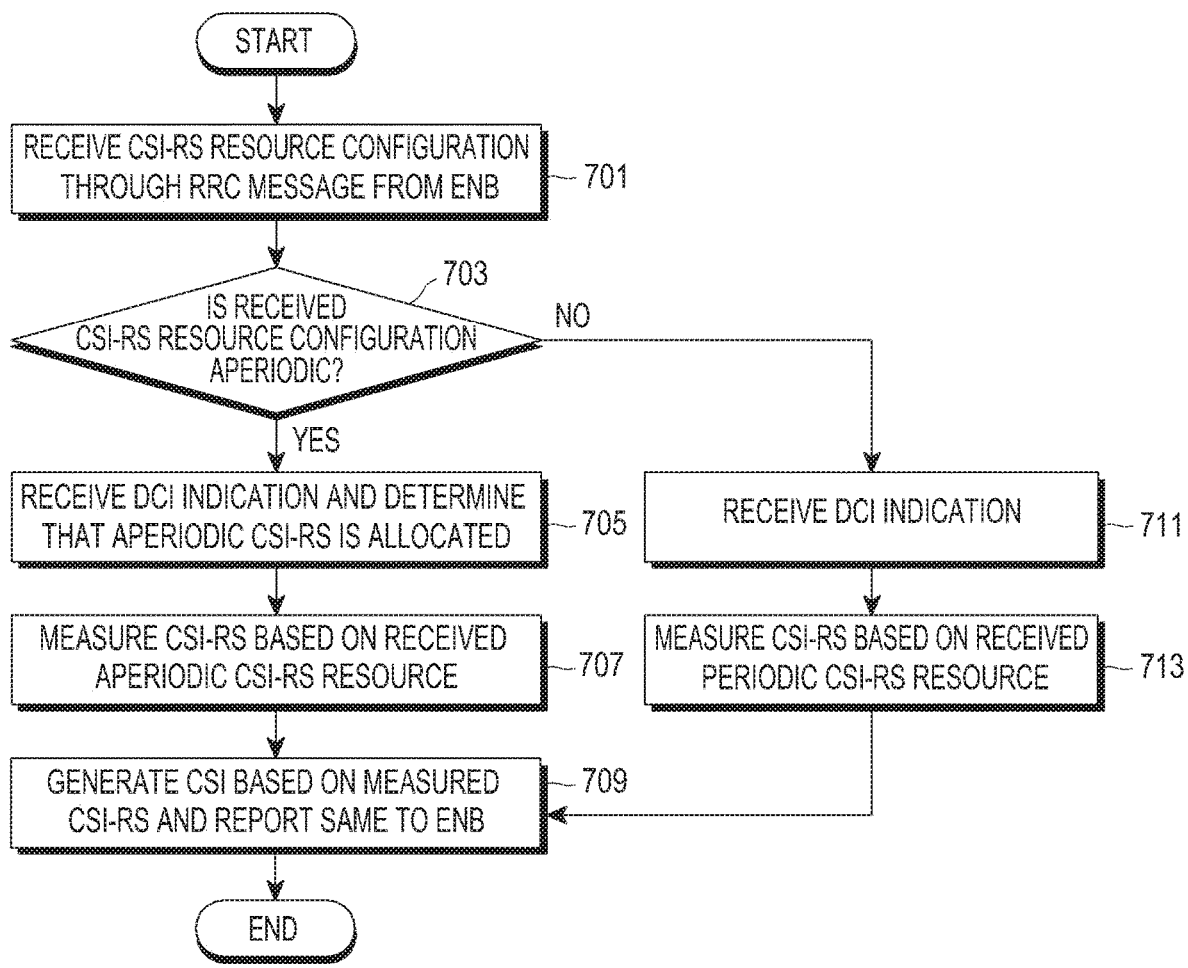
FIG. 7 is a flowchart illustrating operations of a UE according to an embodiment of the present disclosure.

FIG. 7 is a flowchart illustrating operations of a UE according to an embodiment of the present disclosure.

Referring to FIG. 7, the UE receives a CSI-RS resource configuration through an RRC message from an eNB in operation 701.

The UE determines whether the received CSI-RS resource configuration indicates an aperiodic CSI-RS resource in operation 703.

When it is determined that the received CSI-RS resource configuration indicates an aperiodic CSI-RS resource, the UE receives a DCI indication. The UE determines that the aperiodic CSI-RS is allocated to a predetermined subframe based on the DCI indication in operation 705. According to an embodiment, the DCI indication may be CSI request bits included in DCI.

The UE receives and measures a CSI-RS in a subframe corresponding to the DCI based on the aperiodic CSI-RS resource in operation 707.

The UE generates CSI based on a CSI-RS measurement result and reports the same to the eNB in operation 709.

When it is determined that the received CSI-RS resource configuration indicates a periodic CSI-RS resource in operation 703, the UE receives a DCI indication in operation 711. The DCI indication may be CSI request bits included in DCI.

The UE measures a CSI-RS in a subframe corresponding to the DCI based on the periodic CSI-RS resource in operation 713.

The UE performs operation 709 as described above.

Figure 8:
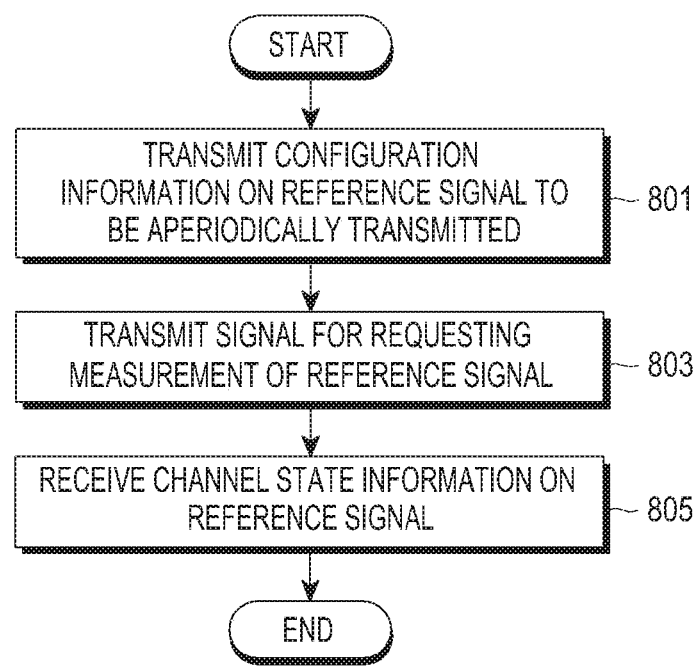
FIG. 8 is a flowchart illustrating operations of an eNB according to an embodiment of the present disclosure.

FIG. 8 is a flowchart illustrating operations of an eNB according to an embodiment of the present disclosure.

Referring to FIG. 8, the eNB transmits configuration information on a reference signal to be aperiodically transmitted to a UE in operation 801.

The eNB transmits a signal for requesting measurement of the reference signal in operation 803.

The eNB receives channel state information on the reference signal in operation 805.

Figure 9:
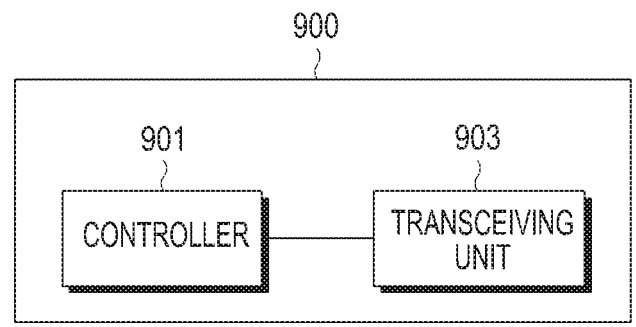
FIG. 9 is a diagram illustrating the configuration of a UE according to an embodiment of the present disclosure.

FIG. 9 is a diagram illustrating the configuration of a UE according to an embodiment of the present disclosure. For ease of description, illustrations and descriptions of elements which are not directly related to the present disclosure will be omitted.

Referring to FIG. 9, a UE 900 may be configured to include a controller 901 and a transceiving unit 903. Here, although it is described that the operations are performed separately using the controller 901 and the transceiving unit 903, the operations may be performed by a single element when needed. Also, the operations may be performed using a larger number of elements.

The transceiving unit 903 receives CSI-RS related information, for example, a CSI-RS configuration, a CSI-RS subframe configuration, a CSI-RS, and the like from the eNB, and reports CSI to the eNB.

The controller 901 may control the operation of the transceiving unit 903, and may perform all operations described in the present disclosure, such as, generating CSI, and the like.

Figure 10:
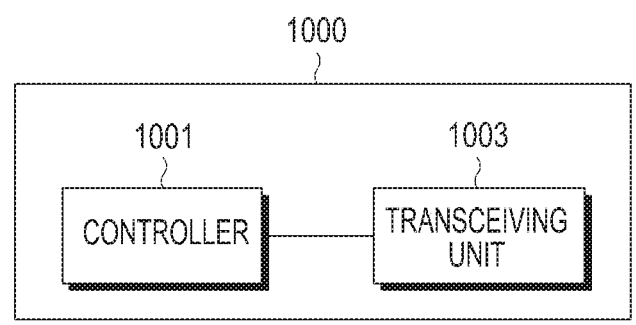
FIG. 10 is a diagram illustrating the configuration of an eNB according to an embodiment of the present disclosure.

FIG. 10 is a diagram illustrating the configuration of an eNB according to an embodiment of the present disclosure. For ease of description, illustrations and descriptions of elements which are not directly related to the present disclosure will be omitted.

Referring to FIG. 10, an eNB 1000 may be configured to include a controller 1001 and a transceiving unit 1003. Here, although it is described that the operations are performed separately using the controller 1001 and the transceiving unit 1003, all operations may be performed by a single element when needed. Also, the operations may be performed using a larger number of elements.

The transceiving unit 1003 transmits, to a UE, CSI-RS related information, for example, a CSI-RS configuration, a CSI-RS subframe configuration, a CSI-RS, and the like, and receives CSI reporting from the UE.

The controller 1001 may control the operation of the transceiving unit 1003, and may perform all operations described in the present disclosure.

Meanwhile, the embodiments of the present disclosure disclosed in the present specification and the drawings have been presented to easily explain technical contents of the present disclosure and help comprehension of the present disclosure, and do not limit the scope of the present disclosure. That is, it is obvious to those skilled in the art to which the present disclosure belongs that different modifications can be achieved based on the technical spirit of the present disclosure. Further, if necessary, the above respective embodiments may be employed in combination.

The invention claimed is:

1. A method for transmitting a reference signal (RS) by a base station, the method comprising:
    transmitting, to a first user equipment (UE), configuration information of a periodic channel state information (CSI)-RS;
    receiving, from the first UE, CSI of the periodic CSI-RS;
    transmitting, to the first UE, information indicating that subsequent measurement of the periodic CSI-RS is required to be performed in a first subframe subsequent to a second subframe through which the periodic CSI-RS is to be transmitted in case that the second subframe is to be overlapped with a third subframe through which an aperiodic CSI-RS for a second UE is to be transmitted; and
    receiving, from the first UE, CSI based on a result of measurement of the periodic CSI-RS which is based on the information.

2. The method of claim 1, wherein the configuration information of the periodic CSI-RS includes at least one of a number of antenna ports, or resource configuration information.

3. The method of claim 1, wherein the first UE and the second UE belongs to a group which shares a same CSI subframe configuration.

4. The method of claim 1, wherein the configuration information is received through a radio resource control (RRC) message.

5. A method for transmitting a reference signal (RS) by a base station, the method comprising:
    transmitting, to a first user equipment (UE), configuration information of a periodic channel state information (CSI) RS;
    receiving, from the first UE, CSI of the periodic CSI-RS; and
    transmitting, to the first UE, information indicating that subsequent measurement of the periodic CSI-RS is required to be performed in a first subframe subsequent to a second subframe through which the periodic CSI-RS is to be transmitted in case that the second subframe is to be overlapped with a third subframe through which an aperiodic CSI-RS for a second UE is to be transmitted.

6. The method of claim 5, wherein the configuration information of the periodic CSI-RS includes at least one of a number of antenna ports, or resource configuration information.

7. The method of claim 5, wherein the first UE and the second UE belong to a group which shares a same CSI subframe configuration.

8. The method of claim 5, wherein the configuration information is transmitted through a radio resource control (RRC) message.

9. A first user equipment (UE) for receiving a reference signal (RS), the first UE comprising:
a transceiver; and
a processor configured to:
control the transceiver to receive, from a base station (BS), configuration information of a periodic channel state information (CSI) RS,
measure the periodic CSI-RS in a subframe based on the received configuration information,
control the transceiver to transmit, to the BS, CSI based on a result of the measurement of the periodic CSI-RS,
control the transceiver to receive, from the BS, information indicating that subsequent measurement of the periodic CSI-RS is required to be performed in a first subframe subsequent to a second subframe through which the periodic CSI-RS is to be transmitted in case that the second subframe is to be overlapped with a third subframe through which an aperiodic CSI-RS for a second UE is to be transmitted, and
control the transceiver to transmit, to the BS, CSI based on a result of measurement of the periodic CSI-RS which is based on the information.

10. The first UE of claim 9, wherein the configuration information of the periodic CSI-RS includes at least one of a number of antenna ports, or resource configuration information.

11. The first UE of claim 9, wherein the first UE and the second UE belong to a group which shares a same CSI subframe configuration.

12. The first UE of claim 9, wherein the configuration information is received through radio resource control (RRC) message.

13. A base station (BS) for transmitting a reference signal (RS), the BS comprising:
a transceiver; and
a processor configured to:
control the transceiver to transmit, to a first user equipment (UE), configuration information of a periodic channel state information (CSI)-RS,
control the transceiver to receive, from the first UE, CSI of the periodic CSI-RS,
control the transceiver to transmit, to the first UE, information indicating that subsequent measurement of the periodic CSI-RS is required to be performed in a first subframe subsequent to a second subframe through which the periodic CSI-RS is to be transmitted in case that the second subframe is to be overlapped with a third subframe through which an aperiodic CSI-RS for a second UE is to be transmitted, and
control the transceiver to receive, from the first UE, CSI based on a result of measurement of the periodic CSI-RS which is based on the information.

14. The BS of claim 13, wherein the configuration information of the periodic CSI-RS includes at least one of a number of antenna ports, or resource configuration information.

15. The BS of claim 13, wherein the first UE and the second UE belong to a group which share a same CSI subframe configuration.

16. The BS of claim 13, wherein the configuration information is transmitted through radio resource control (RRC) message.

* * * * *